United States Patent
Togashi et al.

(10) Patent No.: US 10,094,951 B2
(45) Date of Patent: Oct. 9, 2018

(54) DETERMINING APPARATUS FOR DETERMINING OBJECT STORED IN CASSETTE

(71) Applicant: DISCO CORPORATION, Tokyo (JP)

(72) Inventors: Ken Togashi, Tokyo (JP); Masahiro Tsukamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 15/666,215

(22) Filed: Aug. 1, 2017

(65) Prior Publication Data

US 2018/0045851 A1 Feb. 15, 2018

(30) Foreign Application Priority Data

Aug. 12, 2016 (JP) .................................. 2016-158408

(51) Int. Cl.
*G01V 8/20* (2006.01)
(52) U.S. Cl.
CPC ....................................... *G01V 8/20* (2013.01)
(58) Field of Classification Search
CPC ...... G01B 11/16; G01B 11/0608; G01V 8/20; B25J 11/0095; H01L 21/67383; H01L 21/6732; H01L 21/67326; H01L 21/67346; G01N 21/88
See application file for complete search history.

(56) References Cited

U.S. PATENT DOCUMENTS

| | | | | | |
|---|---|---|---|---|---|
| 5,239,182 | A | * | 8/1993 | Tateyama | H01L 21/67265 250/559.37 |
| 5,906,469 | A | * | 5/1999 | Oka | H01L 21/67265 414/416.08 |
| 6,208,909 | B1 | * | 3/2001 | Kato | H01L 21/67265 414/331.14 |
| 7,206,663 | B2 | * | 4/2007 | Teng | H01L 21/67265 700/218 |
| 2005/0035313 | A1 | * | 2/2005 | Garssen | G01V 8/10 250/559.33 |
| 2005/0186063 | A1 | * | 8/2005 | Rice | H01L 21/67253 414/800 |
| 2007/0139642 | A1 | * | 6/2007 | Ikeda | G01B 11/002 356/150 |

(Continued)

FOREIGN PATENT DOCUMENTS

JP 2014-241333 12/2014

*Primary Examiner* — Sang Nguyen
(74) *Attorney, Agent, or Firm* — Greer Burns & Crain Ltd.

(57) ABSTRACT

Apparatus determines whether a stored object is a wafer alone or a frame unit formed by uniting the wafer and a ring frame. The apparatus includes first and second detecting units, the second detecting unit being stored more shallowly than the first detecting unit. The apparatus determines whether light transmitted by the first detecting unit is blocked by the object and does not reach a light receiving portion of the first detecting unit. When light transmitted from the second detecting unit is blocked by the object and does not reach a light receiving portion of the second detecting unit, the apparatus determines that the object is the frame unit, whereas when the light transmitted from the second detecting unit is not blocked by the object and reaches the light receiving portion of the second detecting unit, the apparatus determines that the object is the wafer.

2 Claims, 6 Drawing Sheets

(56) References Cited

U.S. PATENT DOCUMENTS

| | | | |
|---|---|---|---|
| 2007/0212881 A1* | 9/2007 | Shih | B24B 37/042 |
| | | | 438/691 |
| 2015/0300960 A1* | 10/2015 | Morikawa | H01L 21/67265 |
| | | | 356/240.1 |
| 2016/0091306 A1* | 3/2016 | Hashimoto | G01B 11/26 |
| | | | 414/222.02 |

* cited by examiner

DETERMINING APPARATUS FOR DETERMINING OBJECT STORED IN CASSETTE

BACKGROUND OF THE INVENTION

Field of the Invention

The present invention relates to a determining apparatus for determining an object such as a wafer stored in a cassette (storing means).

Description of the Related Art

A plurality of devices such as integrated circuits (ICs) and large-scale integrations (LSIs) are formed on the front side of a wafer. The back side of the wafer having the plural devices on the front side is ground to reduce the thickness of the wafer to a predetermined thickness. Thereafter, the wafer is divided into individual device chips by using a processing apparatus. The device chips thus obtained are mounted in electronic equipment such as mobile phones and personal computers.

In general, the wafer is stored in a cassette (storing means) to transfer the wafer to a processing apparatus such as a grinding apparatus and a cutting apparatus. Particularly in a process (so-called front-end process) of forming semiconductor devices on the front side of the wafer, a cassette called front opening unified pod (FOUP) is used to prevent a problem such that dust or the like present in the atmosphere may adhere to the front side of the wafer. Such an FOUP cassette has a closing mechanism (door or lid) for closing a front opening. Accordingly, a storing space defined in the cassette can be enclosed by the closing mechanism in transferring the wafer. The processing apparatus is provided with a mount table (which will be hereinafter referred to as load port) for mounting the cassette as storing means thereon. When the FOUP cassette is placed on the load port and the closing mechanism of the FOUP cassette is opened (the door or lid is opened), transfer means included in the processing apparatus is allowed to gain access to the wafer stored in the FOUP cassette.

In some case, a wafer alone is stored in storing means such as a cassette. In another case, a frame unit formed by uniting a wafer and a ring frame (annular frame) is also stored in such storing means, wherein a tape is supported at its peripheral portion to the ring frame, and the wafer is attached to the central portion of the tape. Further, there is a cassette capable of storing both a wafer alone and such a frame unit. However, a conventional load port is designed so as to be dedicated to storing means for storing a wafer alone or storing means for storing a frame unit. That is, a conventional processing apparatus must include two kinds of load ports responding to the storing means for the wafer alone and the storing means for the frame unit.

Japanese Patent Laid-open No. 2014-241333 discloses a load port realizing the functions of such two kinds of load ports. That is, this load port can determine whether the cassette placed thereon is a cassette storing a wafer alone or a cassette storing a frame unit.

SUMMARY OF THE INVENTION

However, in the case of using a cassette capable of storing both a wafer alone and a frame unit, the kind of the cassette can be determined, but the kind of the object stored in the cassette cannot be determined. The processing apparatus is operated to select transfer means fit for the kind of the object and then load this object into the processing apparatus by using this transfer means. However, unless the kind of the object can be determined, the transfer means fit for the kind of the object cannot be used. Particularly in the case of the FOUP cassette as mentioned above, the inside of the cassette cannot be visually recognized in the closed condition of the closing mechanism. Accordingly, an operator cannot visually determine the kind of the object stored in the FOUP cassette and therefore cannot input the kind of the object into the processing apparatus.

It is therefore an object of the present invention to provide a determining apparatus which can reliably determine whether the object stored in the cassette is a wafer alone or a frame unit formed by uniting the wafer and a ring frame.

In accordance with an aspect of the present invention, there is provided a determining apparatus for determining whether an object stored by storing means having a storing space is a wafer alone or a frame unit formed by uniting the wafer and a ring frame; the determining apparatus including first detecting means adapted to be inserted in the storing space and second detecting means adapted to be inserted in the storing space more shallowly than the first detecting means; each the first detecting means and the second detecting means including a light transmitting portion and a light receiving portion spaced from each other by a predetermined distance in a horizontal direction; the determining apparatus further including determining means for determining whether the object is the wafer or the frame unit in the condition where the first detecting means and the second detecting means are inserted in the storing space to a predetermined position where light transmitted from the light transmitting portion of the first detecting means is blocked by the object and does not reach the light receiving portion of the first detecting means; wherein when light transmitted from the light transmitting portion of the second detecting means is blocked by the object and does not reach the light receiving portion of the second detecting means, the determining means determines that the object is the frame unit, whereas when the light transmitted from the light transmitting portion of the second detecting means is not blocked by the object and reaches the light receiving portion of the second detecting means, the determining means determines that the object is the wafer.

Preferably, the object includes a plurality of objects stored in the storing space of the storing means, and the determining means determines whether each of the objects is the wafer or the frame unit by scanning the first detecting means and the second detecting means in a vertical direction in the condition where the first detecting means and the second detecting means are inserted in the storing space to the predetermined position.

Preferably, the determining apparatus further includes third detecting means for detecting the frame unit; the third detecting means having a light transmitting portion and a light receiving portion spaced from each other by a predetermined distance in a horizontal direction parallel to a line connecting the light transmitting portion and the light receiving portion of the first detecting means, the predetermined distance between the light transmitting portion and the light receiving portion of the third detecting means being shorter than the predetermined distance between the light transmitting portion and the light receiving portion of the first detecting means; the determining means determining whether or not the object is the frame unit in the condition where the light transmitted from the light transmitting portion of the first detecting means is blocked by the object and does not reach the light receiving portion of the first detecting means; wherein when light transmitted from the light transmitting portion of the third detecting means is reflected on the object and then reaches the light receiving portion of the third detecting means, the determining means determines that the object is the frame unit.

The determining apparatus of the present invention is provided in the vicinity of a load port of a processing apparatus. Prior to loading the object (the wafer or the frame unit) into the processing apparatus, the kind of the object stored in the storing means can be determined by the determining apparatus. Particularly in the case that the storing means is an FOUP cassette having a door, the determining apparatus can determine the kind of the object in the condition where the door of the FOUP cassette is open in loading the object into the processing apparatus. After determining the kind of the object stored in the cassette, it can be decided which of transfer means fit for the wafer alone and transfer means fit for the frame unit is to be used in loading the object into the processing apparatus. Accordingly, suitable transfer means in the processing apparatus can be operated to gain access to the object stored in the cassette.

The determining apparatus of the present invention is widely applicable to any storing means having a storing space into which the first and second detecting means can be inserted. That is, the determining apparatus of the present invention is also applicable to any cassettes other than the FOUP cassette. In any cassettes other than the FOUP cassette, the object stored in each cassette can be visually recognized from the outside thereof. However, when placing the cassette on the load port of the processing apparatus, an operator is required to input and record the kind of the object into the processing apparatus. In the case that the determining apparatus of the present invention is provided between the cassette and a load/unload opening of the processing apparatus, the kind of the object stored in the storing space of the cassette can be automatically determined by the determining apparatus. Accordingly, it is unnecessary for the operator to input the kind of the object into the processing apparatus, but the suitable transfer means in the processing apparatus can be operated to gain access to the object stored in the cassette. Thus, the determining apparatus of the present invention is useful not only for an FOUP cassette, but also for any other cassettes.

According to the present invention, it is possible to provide a determining apparatus which can reliably determine whether the object stored in the cassette is a wafer alone or a frame unit formed by uniting the wafer and a ring frame.

The above and other objects, features and advantages of the present invention and the manner of realizing them will become more apparent, and the invention itself will best be understood from a study of the following description and appended claims with reference to the attached drawings depicting a preferred embodiment of the invention.

DETAILED DESCRIPTION OF THE PREFERRED EMBODIMENT

Figure 1A:
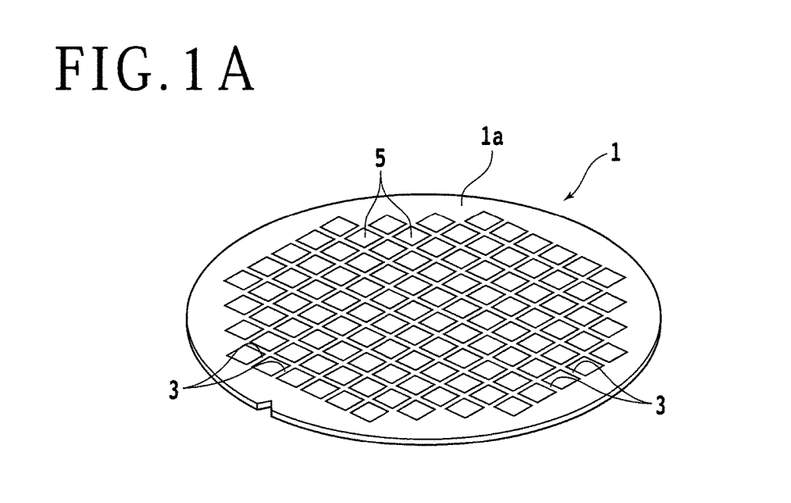
FIG. 1A is a schematic perspective view of a wafer.

A preferred embodiment of the present invention will now be described. An object to be stored in storing means will first be described. The object is a target to be determined by a determining apparatus according to this preferred embodiment. FIG. 1A depicts a wafer 1 alone as an example of the object to be stored in the storing means. The wafer 1 is formed of silicon or SiC (silicon carbide), for example. The wafer 1 may be formed of any other semiconductor materials or other materials such as sapphire, glass, and quartz. The wafer 1 as a target to be determined by the determining apparatus according to this preferred embodiment is a substantially disk-shaped wafer. However, the determining apparatus of the present invention may be configured so as to also determine a rectangular substrate.

Figure 1B:
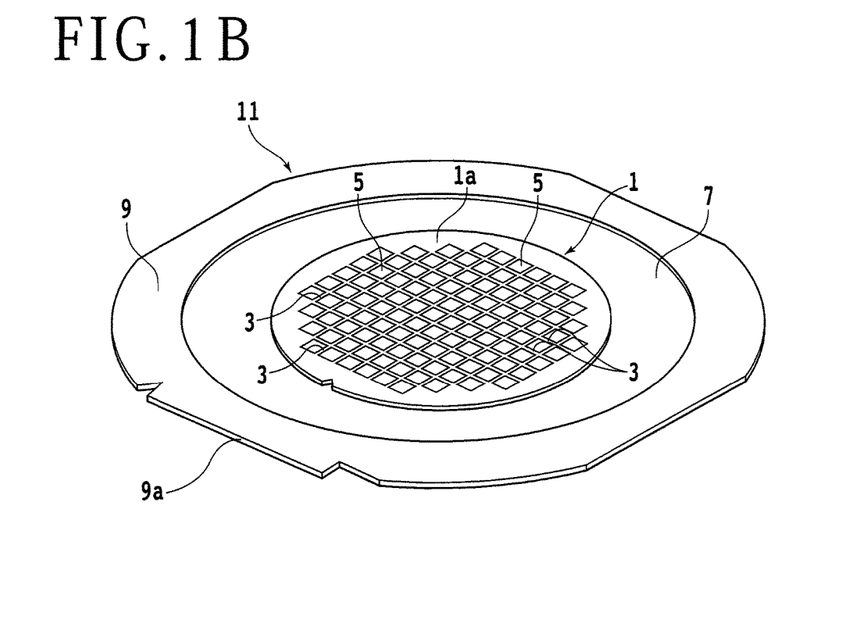
FIG. 1B is a schematic perspective view of a frame unit formed by uniting the wafer and a ring frame.

As depicted in FIG. 1A, the front side 1a of the wafer 1 is partitioned by a plurality of crossing division lines 3 to define a plurality of separate regions where a plurality of devices 5 such as ICs, microelectromechanical systems (MEMSs), and light-emitting diodes (LEDs) are formed. The wafer 1 is finally divided along the division lines 3 to obtain a plurality of device chips. FIG. 1B depicts a frame unit 11 formed by uniting the wafer 1 with a ring frame (annular frame) 9 as another example of the object to be stored in the storing means. As depicted in FIG. 1B, the ring frame 9 has a substantially circular opening, and a tape 7 is attached at its peripheral portion to the ring frame 9 so as to close the opening of the ring frame 9. Further, the wafer 1 is attached to the central portion of the tape 7 exposed to the opening of the ring frame 9. Thus, the wafer 1 is supported through the tape 7 to the ring frame 9 to thereby form the frame unit 11 as a unit of the wafer 1, the tape 7, and the ring frame 9. As described above, the devices 5 are formed in the respective separate regions defined by the division lines 3 on the front side 1a of the wafer 1. The ring frame 9 has a flat side surface 9a. As will be described later, a determining apparatus 22 functions to apply light to the flat side surface 9a of the ring frame 9 and detect the light reflected from the flat side surface 9a, thereby determining that the object stored in the storing means is the frame unit 11. In contrast, the wafer 1 has a curved side surface. Accordingly, when light is applied to the curved side surface of the wafer 1, the light is not reflected toward the determining apparatus 22, that is, the light is not detected by the determining apparatus 22. In this case, the determining apparatus 22 determines that the object stored in the storing means is the wafer 1 alone. The configuration of the determining apparatus 22 will be hereinafter described in detail.

Figure 2A:
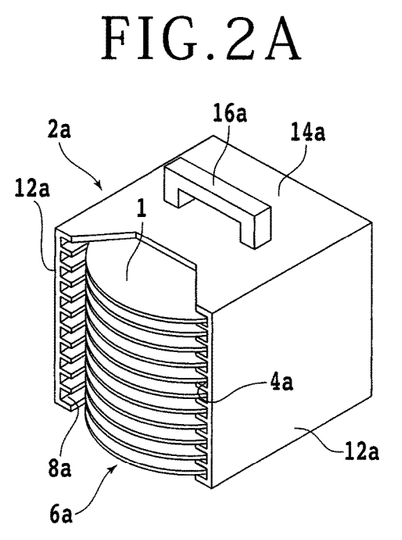
FIG. 2A is a schematic perspective view depicting storing means for storing the wafer depicted in FIG. 1A.

The storing means for storing the object including the wafer 1 will now be described. FIG. 2A is a schematic perspective view of storing means 2a for storing the wafer 1 alone as an example of the storing means (cassette). As depicted in FIG. 2A, the storing means 2a can store a plurality of wafers 1 in a stacked manner. The storing means 2a has a front side where an inlet/outlet portion 4a is formed as an opening to allow the pass of the wafer 1. A storing space 6a is defined in the storing means 2a, wherein the wafer 1 is adapted to be inserted from the inlet/outlet portion 4a into the storing space 6a. The storing space 6a is defined by a pair of side wall members 12a and an upper wall member 14a connecting the side wall members 12a at their upper ends. The inside surface of each side wall member 12a is formed with a rack 8a having a plurality stages. The wafer 1 inserted into the storing space 6a is adapted to be placed on any one of the plural stages of each rack 8a (on the opposite stages of the pair of racks 8a at the same height). In storing the wafer 1 into the storing space 6a, the wafer 1 is vertically moved to a desired height corresponding to any one of the plural stages of each rack 8a and next inserted into the storing space 6a to a predetermined horizontal position on the predetermined stage. The upper surface of the upper wall member 14a is provided with a handle 16a for use in transferring the storing means 2a.

The configuration of the storing means (cassette) 2a may be suitably modified, provided that the storing means 2a has a fundamental configuration. For example, the upper wall member 14a or the side wall members 12a may not be provided. Further, the storing means 2a may further include a lower wall member or a rear wall member. The handle 16a may be provided on any portion of the storing means 2a other than the upper wall member 14a. Further, the handle 16a may be replaced by a connecting mechanism (not depicted) to be mounted to transfer means installed in a clean room or the like, wherein the storing means 2a is transferred by the transfer means through the connecting mechanism.

Figure 2B:
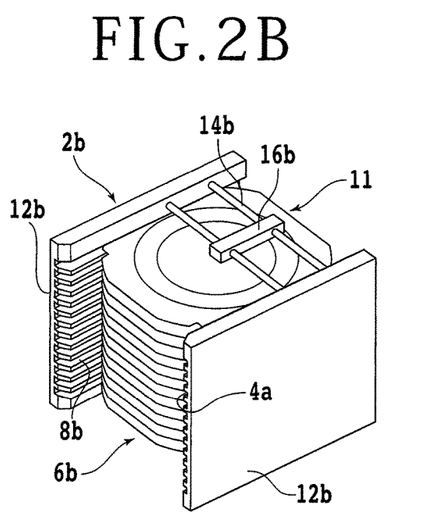
FIG. 2B is a schematic perspective view depicting storing means for storing the frame unit depicted in FIG. 1B.

FIG. 2B is a schematic perspective view of storing means 2b for storing the frame unit 11 as another example of the storing means. The storing means 2b depicted in FIG. 2B has a fundamental configuration similar to that of the storing means 2a depicted in FIG. 2A. Specifically, the storing means 2b has an inlet/outlet portion 4b as an opening and a storing space 6b, wherein the frame unit 11 is adapted to be inserted from the inlet/outlet portion 4b into the storing space 6b. The storing space 6b is defined by a pair of side wall members 12b and a structure 14b connecting the side wall members 12b at their upper ends. The inside surface of each side wall member 12b is formed with a rack 8b having a plurality of stages. The frame unit 11 inserted into the storing space 6b is adapted to be placed on any one of the plural stages of each rack 8b. The structure 14b connecting the side wall members 12b may be provided on the lower side of the storing means 2b.

Figure 2C:
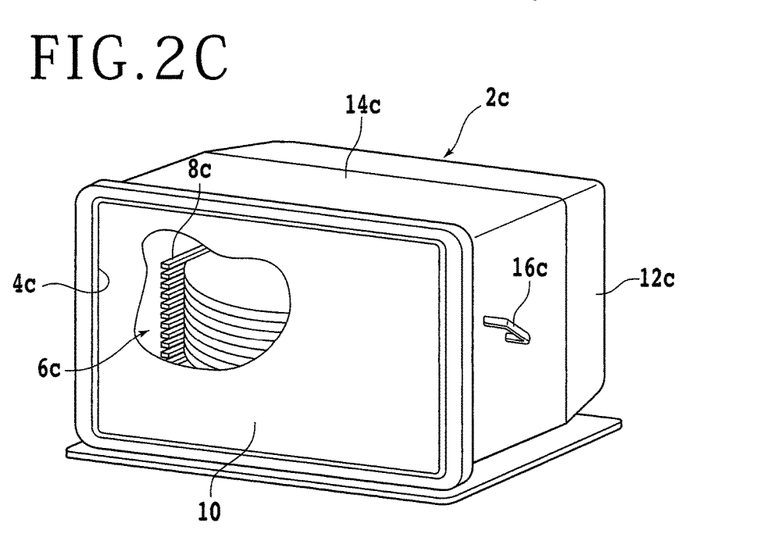
FIG. 2C is a schematic perspective view depicting FOUP type storing means.

FIG. 2C is a schematic perspective view of FOUP type storing means 2c as still another example of the storing means. As depicted in FIG. 2C, the FOUP type storing means 2c has an inlet/outlet portion 4c as an opening on the front side, a lid (door) 10 for closing the inlet/outlet portion 4c, and a housing for enclosing a storing space 6c except the inlet/outlet portion 4c, wherein the lid 10 is closed to enclose the storing space 6c at all times except in the case of storing the object into the storing space 6c or taking the object out of the storing space 6c. By closing the lid 10, the entry of dust or the like present in the atmosphere into the storing space 6c can be suppressed, so that the storing space 6c can be kept clean to thereby prevent the contamination of the object stored in the storing space 6c. Thus, when the lid 10 is in a closed condition, the cleanness of the storing space 6c can be maintained at a high level. Accordingly, if the cleanness of an external environment outside the storing means 2c is maintained at a predetermined level, it is unnecessary to increase a cost for improving the cleanness of the external environment to a higher level. The housing of the storing means 2c is composed of a pair of side wall members 12c, an upper wall member 14c, a rear wall member (not depicted), and a lower wall member (not depicted). The inside surface of each side wall member 12c is formed with a rack 8c having a plurality of stages. A handle 16c is mounted on the outer surface of each side wall member 12c. The storing means 2c may be configured so that it can store both the wafer 1 alone and the frame unit 11.

When the FOUP type storing means 2c is placed on a load port of a processing apparatus and the lid 10 is next opened, the object stored in the storing means 2c is allowed to be loaded into the processing apparatus. The wafer 1 alone or the frame unit 11 inserted into the storing space 6c is placed on any one of the plural stages of each rack 8c. After loading the object into the processing apparatus, the lid 10 is closed again. In the closed condition of the lid 10 of the storing means 2c, the kind of the object stored in the storing space 6c cannot be visually determined unless the housing of the storing means 2c is transparent. Further, the lid 10 of the storing means 2c is opened only when the storing means 2c is placed on the load port and the inlet/outlet portion 4c is opposed to a load/unload opening of the processing apparatus as will be described later. Accordingly, even in this condition, it is not easy to visually determine the kind of the object stored in the storing space 6c. To cope with this problem, the determining apparatus according to this preferred embodiment is configured so as to determine the kind of the object stored in the storing space 6c. According to the result of this determination, the processing apparatus selects the proper transfer means to allow the access to the object stored in the storing space 6c.

Figure 3:
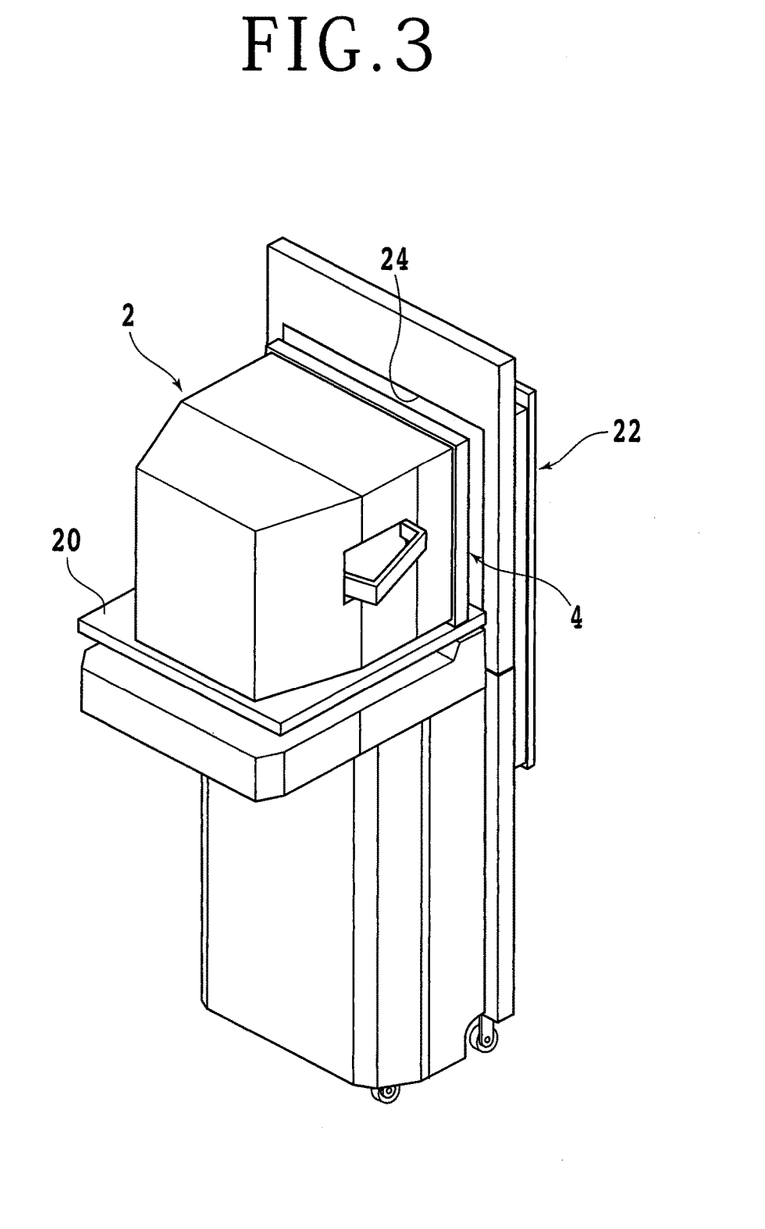
FIG. 3 is a schematic perspective view for illustrating a positional relation among a determining apparatus, a load port, and storing means.

The determining apparatus according to this preferred embodiment will now be described. FIG. 3 is a schematic perspective view depicting a load port 20 of a processing apparatus (not depicted), storing means 2 placed on the upper surface of the load port 20, and a determining apparatus 22 for determining the kind of the object stored in the storing means 2. The processing apparatus has a load/unload opening 24 for allowing the pass of the object stored in the storing means 2. The load/unload opening 24 is normally closed by a door (not depicted). The storing means 2 has an inlet/outlet portion 4 as an opening adapted to be opposed to the load/unload opening 24 of the processing apparatus. That is, the storing means 2 is placed on the load port 20 in the condition where the inlet/outlet portion 4 is opposed to the door closing the load/unload opening 24 of the processing apparatus. In this condition, the storing means 2 is moved toward the load/unload opening 24 of the processing apparatus by a predetermined distance, and the door closing the load/unload opening 24 is next opened. In this condition, transfer means included in the processing apparatus or the determining apparatus 22 can gain access through the inlet/ outlet portion 4 to the object stored in the storing space 6 defined by the storing means 2. The determining apparatus 22 is located in the vicinity of the load/unload opening 24 of the processing apparatus. The determining apparatus 22 is vertically movable between an upper position as an access position and a lower position as a retract position. That is, when the determining apparatus 22 is operated to perform the determination of the object, the determining apparatus 22 is raised to the access position where detecting means to be hereinafter described can be inserted into the storing space 6 of the storing means 2. Conversely, when the transfer means of the processing apparatus is operated to load/unload the object through the load/unload opening 24, the determining apparatus 22 is lowered to the retract position so as not to interfere with the transfer means.

FIG. 3 depicts an FOUP type cassette as an example of the storing means 2. However, the storing means 2 adapted to be placed on the load port 20 of the processing apparatus is not limited to such an FOUP type cassette. In the case that the storing means 2 is not an FOUP type, the kind of the object stored in the storing means 2 can be visually determined. However, in general, an operator is required to input the kind of the object into the processing apparatus in order that proper transfer means in the processing apparatus can gain access to the object. To the contrary, the determining apparatus 22 according to this preferred embodiment can eliminate the need for inputting the kind of the object from the operator. That is, the kind of the object can be determined by the determining apparatus 22, and the kind thus determined can be automatically input into the processing apparatus. There will now be described the components of the determining apparatus 22 and the determination by the determining apparatus 22.

Figure 4A:
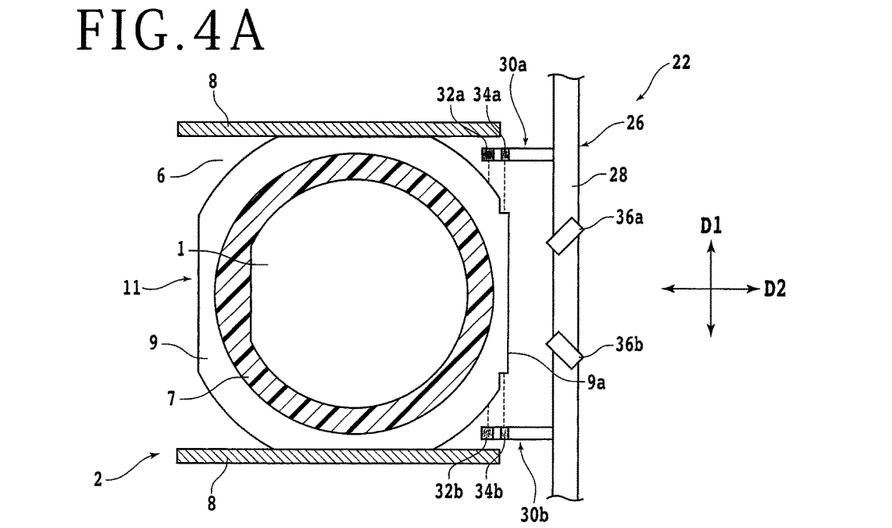
FIG. 4A is a schematic plan view for illustrating an operation of the determining apparatus in the case of determining the frame unit by using first and second detecting means.
Figure 4B:
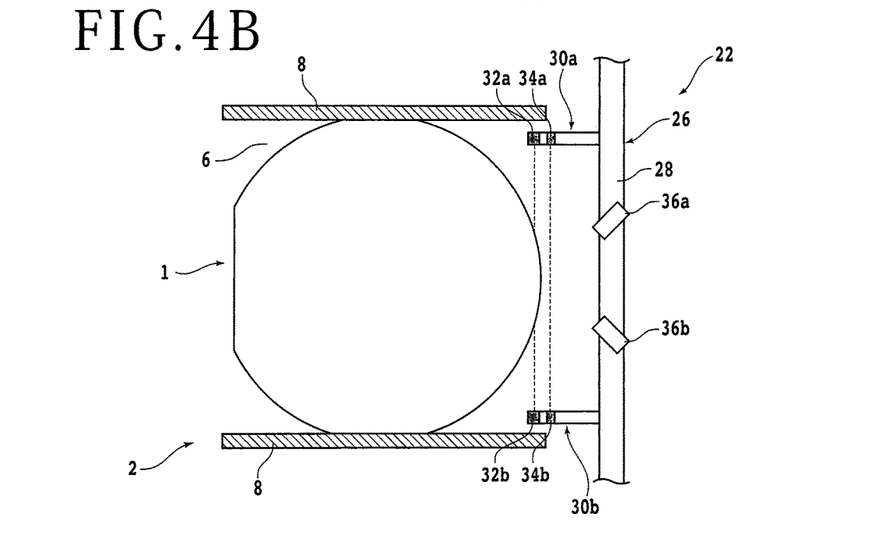
FIG. 4B is a schematic plan view for illustrating an operation of the determining apparatus in the case of determining the wafer by using the first and second detecting means.

FIG. 4A is a schematic plan view depicting a first case that the frame unit 11 is stored in the storing space 6 of the storing means 2 and this frame unit 11 is determined by the determining apparatus 22, and FIG. 4B is a schematic plan view depicting a second case that the wafer 1 is stored in the storing space 6 and it is determined by the determining apparatus 22. In FIGS. 4A and 4B, first detecting means and second detecting means are included in the determining apparatus 22 and they are inserted in the storing space 6 of the storing means 2. The first detecting means and the second detecting means will be hereinafter described in detail. The components of the determining apparatus 22 will now be described with reference to FIG. 4A. As depicted in FIG. 4A, the determining apparatus 22 includes a platelike base (supporting means) 26 located in the vicinity of the load/unload opening 24 (see FIG. 3) of the processing apparatus. The base 26 is supported through an elevating mechanism (not depicted) to the processing apparatus. That is, the base 26 is vertically movable between an upper detection position and a lower retraction position. The base 26 has a first surface opposed to the load/unload opening 24 in the condition where the base 26 is set at the upper detection position. The base 26 has a length in a first direction D1 (width direction) parallel to the first surface, i.e., in a horizontal direction. This length (width) of the base 26 in the first direction D1 is larger than the length of the inlet/outlet portion (see FIG. 3) of the storing means 2 in the first direction D1. Further, the base 26 has a length in a second direction D2 (thickness direction) perpendicular to the first surface. This length (thickness) of the base 26 in the second direction D2 is set so as to accommodate a determining unit (determining means) (not depicted) constituting the determining apparatus 22. However, the size of the base 26 is not especially limited.

A pair of first and second projections 30a and 30b are provided at the upper end of the base 26 so as to project toward the load/unload opening 24. The first and second projections 30a and 30b are spaced from each other in the first direction D1 and located at substantially the same height. Each the first and second projections 30a and 30b is a rodlike member formed of stainless steel, for example. The first and second projections 30a and 30b have the same length. However, the manner of mounting the first and second projections 30a and 30b is not especially limited. For example, the first and second projections 30a and 30b may be indirectly mounted to the base 26. More specifically, the first and second projections 30a and 30b may be supported to a rodlike support member (detecting means support member 28) extending in the first direction D1, and this detecting means support member 28 may be fixed to the base 26. In this preferred embodiment, the first and second projections 30a and 30b are supported to the detecting means support member 28 as depicted in FIGS. 4A and 4B.

The detecting means support member 28 is movable toward the storing means 2 placed on the load port 20 by operating a horizontal moving mechanism (not depicted) including a motor or the like. Accordingly, the first and second projections 30a and 30b supported to the detecting means support member 28 can be inserted into the storing space 6 of the storing means 2. As a modification, the detecting means support member 28 may have a horizontal moving mechanism for moving the first and second projections 30a and 30b toward the storing means 2. That is, the horizontal movement of the first and second projections 30a and 30b may be made independent of the horizontal movement of the detecting means support member 28. All of the base (supporting means) 26, the detecting means support member 28, and the first and second projections 30a and 30b constituting the determining apparatus 22 are formed of stainless steel, for example. Each of these components has a hollow structure for allowing the routing of electrical wires or optical fibers, wherein the electrical wires are used as communication lines for detecting means and control means to be hereinafter described, and the optical fibers are used to guide light for the detecting means. However, the material and shape of these structures are not especially limited.

A light transmitting portion 32a included in the first detecting means is provided in the vicinity of the front end of the first projection 30a, and a light transmitting portion 34a included in the second detecting means is provided on the first projection 30a so as to be spaced from the light transmitting portion toward the base end of the first projection 30a. Further, a light receiving portion 32b included in the first detecting means is provided in the vicinity of the front end of the second projection 30b, and a light receiving portion 34b included in the second detecting means is provided on the second projection 30b so as to be spaced from the light receiving portion 32b toward the base end of the second projection 30b. In the first detecting means, the light transmitting portion 32a and the light receiving portion 32b may be exchanged in position. Similarly, in the second detecting means, the light transmitting portion 34a and the light receiving portion 34b may be exchanged in position. The light transmitting portion 32a of the first detecting means is spaced by a predetermined distance from the light receiving portion 32b of the first detecting means in the axial direction of the detecting means support member 28. This predetermined distance is set so that a part of the object stored in the storing means 2 can be interposed between the light transmitting portion 32a and the light receiving portion 32b and that both the light transmitting portion 32a and the light receiving portion 32b can be simultaneously inserted in the storing space 6. Similarly, the light transmitting portion 34a of the second detecting means and the light receiving portion 34b of the second detecting means are spaced by this predetermined distance from each other in the axial direction of the detecting means support member 28. As a modification, the first and second projections 30a and 30b supported to the detecting means support member 28 may be movable on the detecting means support member 28 in the axial direction thereof. In this case, the spacing between the first and second projections 30a and 30b can be adjusted to the above predetermined distance according to the size of the storing means 2 and the size of the object. That is, the horizontal positions of the first and second projections 30a and 30b in the axial direction of the detecting means support member 28 can be changed according to the size of the storing space 6 and the size of the object.

The first and second projections 30a and 30b are inserted into the storing space 6 to a predetermined position where a part of the object stored in the storing space 6 is interposed between the first and second projections 30a and 30b. As described above, the light transmitting portion 32a and the light receiving portion 32b of the first detecting means are set in a horizontal position deeper than that of the light transmitting portion 34a and the light receiving portion 34b of the second detecting means in the storing space 6. That is, the second detecting means is inserted into the storing space 6 to a horizontal position shallower than that of the first detecting means. The light transmitting portion 32a of the first detecting means functions to transmit light to the light receiving portion 32b of the first detecting means. If anybody blocking the light is absent, for example, if the object stored in the storing means 2 is absent between the light transmitting portion 32a and the light receiving portion 32b, the light transmitted from the light transmitting portion 32a is allowed to reach the light receiving portion 32b, so that the light is received by the light receiving portion 32b. The light transmitting portion 34a and the light receiving portion 34b of the second detecting means also function similarly.

Each the first and second detecting means uses a light source such as LED and laser beam oscillator. However, it is unnecessary to provide the light source in the first projection 30a. That is, the light source may be provided on the base (supporting means) 26 or outside the determining apparatus 22. In this case, an optical fiber or the like may be provided in the detecting means support member 28 and the first projection 30a, thereby guiding the light emitted from the light source through the optical fiber to the light transmitting portions 32a and 34a of the first and second detecting means. Thus, the light is transmitted from the light transmitting portions 32a and 34a to the light receiving portions 32b and 34b of the first and second detecting means, respectively. Further, each the first and second detecting means uses a photodetector such as charge-coupled device (CCD) and complementary metal oxide semiconductor (CMOS). However, it is unnecessary to provide the photodetector in the second projection 30b. That is, the photodetector may be provided on the base (supporting means) 26 or outside the determining apparatus 22. In this case, an optical fiber or the like may be provided in the second projection 30b or the detecting means support member 28, thereby guiding the light received by the light receiving portions 32b and 34b of the first and second detecting means, from the light receiving portions 32b and 34b through the optical fiber to the photodetector. Thus, the light received by the light receiving portions 32b and 34b is detected by the photodetector.

The determining apparatus 22 further includes third detecting means composed of a light transmitting portion 36a and a light receiving portion 36b as depicted in FIGS. 4A and 4B. The light transmitting portion 36a and the light receiving portion 36b of the third detecting means are supported to the detecting means support member 28. The light transmitting portion 36a and the light receiving portion 36b are spaced from each other in the first direction D1 parallel to the line connecting the light transmitting portion 32a and the light receiving portion 32b of the first detecting means, wherein the distance between the light transmitting portion 36a and the light receiving portion 36b is shorter than the distance between the light transmitting portion 32a and the light receiving portion 32b. The light transmitting portion 36a of the third detecting means functions to transmit light toward the object stored in the storing means 2. The light transmitted from the light transmitting portion 36a of the third detecting means is reflected by the object stored in the storing means 2. In the case that the light reflected from the object reaches the light receiving portion 36b of the third detecting means, the light is detected by the light receiving portion 36b. Conversely, in the case that the light reflected from the object does not reach the light receiving portion 36b of the third detecting means, the light is not detected by the light receiving portion 36b. The light transmitting portion 36a of the third detecting means may be similar in configuration to the light transmitting portions 32a and 34a of the first and second detecting means. Further, the light receiving portion 36b of the third detecting means may be similar in configuration to the light receiving portions 32b and 34b of the first and second detecting means.

The determining apparatus 22 further includes determining means (not depicted). The determining means is connected through wiring to each detecting means. The determining means functions to control the transmission of light from each light transmitting portion and also to input information on the detection of light by each light receiving portion. The determining means further functions to determine the kind of the object stored in the storing space 6, according to the result of detection by each detecting means.

A determining method for the object by the determining apparatus 22 will now be described. First, the first and second projections 30a and 30b are inserted into the storing space 6 to a predetermined position. Thereafter, the height of the detecting means support member 28 is adjusted so that a part of the object stored in the storing space 6 is interposed between the light transmitting portion 32a of the first detecting means and the light receiving portion 32b of the first detecting means. The vertical movement of the detecting means support member 28 is effected by operating the elevating mechanism (not depicted) of the determining apparatus 22 to vertically move the base 26 as a whole. The height adjustment for the detecting means support member 28 is performed as transmitting light from the light transmitting portion 32a toward the light receiving portion 32b. When the detecting means support member 28 is vertically moved to the position where a part of the object is interposed between the light transmitting portion 32a and the light receiving portion 32b, the light transmitted from the light transmitting portion 32a is blocked by the object, so that the light is not received by the light receiving portion 32b. Accordingly, when the light transmitted from the light transmitting portion 32a is not received by the light receiving portion 32b, the determining means determines that the height of the detecting means support member 28 has been adjusted to a predetermined height. After finishing the height adjustment for the detecting means support member 28, light is transmitted from the light transmitting portion 34a of the second detecting means toward the light receiving portion 34b of the second detecting means.

In the case that the object stored in the storing space 6 is the frame unit 11 as depicted in FIG. 4A, the light transmitted from the light transmitting portion 34a of the second detecting means is blocked by the frame unit 11, so that the light is not received by the light receiving portion 34b of the second detecting means. In this case, the light is not detected by the second detecting means, and the determining means of the determining apparatus 22 determines that the object stored in the storing space 6 is the frame unit 11. In contrast, in the case that the object stored in the storing space 6 is the wafer 1 alone as depicted in FIG. 4B, the light transmitted from the light transmitting portion 34a of the second detecting means is not blocked by the wafer 1, so that the light is received by the light receiving portion 34b of the second detecting means. In this case, the light is detected by the second detecting means, and the determining means of the determining apparatus 22 determines that the object stored in the storing space 6 is the wafer 1 alone. Thus, by utilizing the difference in shape between the wafer 1 and the frame unit 11, the determining means of the determining apparatus 22 can determine the kind of the object according to whether or not the light transmitted from the light transmitting portion 34a of the second detecting means is received by the light receiving portion 34b of the second detecting means. The layout of the second detecting means may be suitably changed in the range where the difference in shape between the wafer 1 and the frame unit 11 can be recognized by the second detecting means.

The above determination may be performed by using the third detecting means including the light transmitting portion 36a and the light receiving portion 36b in place of the second detecting means. A determining method for the object by the use of the third detecting means will now be described with reference to FIG. 5. First, the height of the detecting means support member 28 is adjusted so that a part of the object is interposed between the light transmitting portion 32a of the first detecting means and the light receiving portion 32b of the first detecting means. The height adjustment for the detecting means support member 28 is performed similarly to the above by using the first detecting means. After finishing the height adjustment for the detecting means support member 28, light is transmitted from the light transmitting portion 36a of the third detecting means toward the object stored in the storing means 6.

Figure 5:
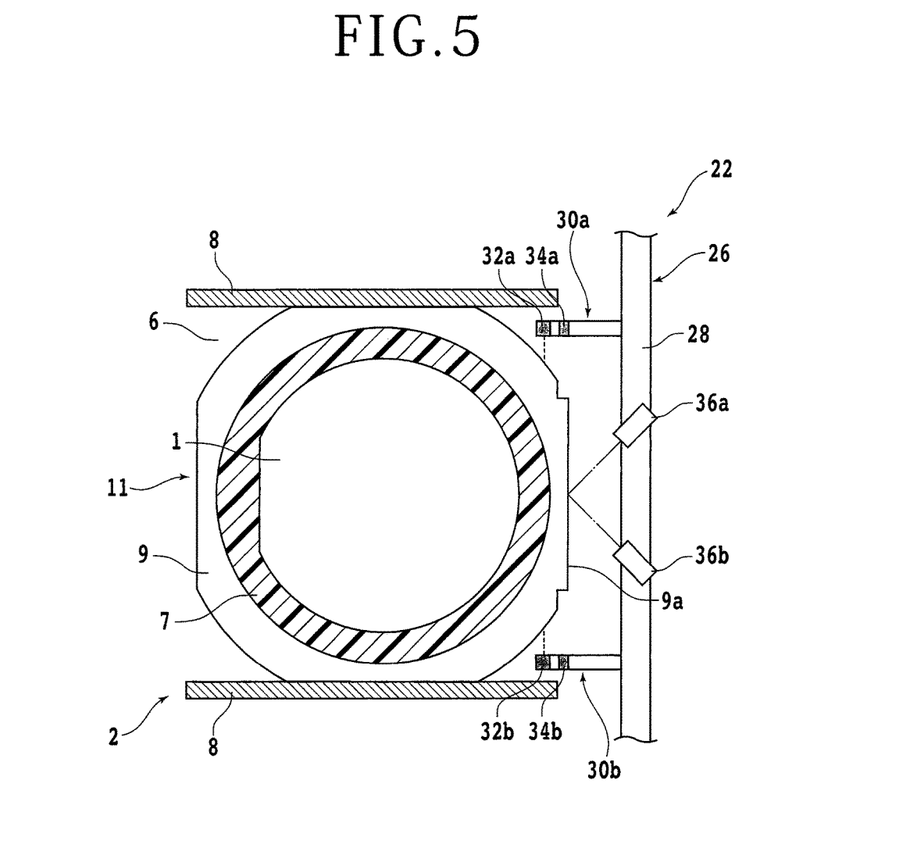
FIG. 5 is a schematic plan view for illustrating an operation of the determining apparatus in the case of determining the frame unit by using third detecting means in place of the second detecting means.

In the case that the object stored in the storing space 6 is the frame unit 11 as depicted in FIG. 5, the light transmitted from the light transmitting portion 36a of the third detecting means impinges on the flat side surface 9a of the ring frame 9 constituting the frame unit 11 and is then reflected on the flat side surface 9a. The light reflected from the flat side surface 9a reaches the light receiving portion 36b of the third detecting means. In this case, the light is detected by the third detecting means, and the determining means of the determining apparatus 22 determines that the object stored in the storing space 6 is the frame unit 11. In contrast, in the case that the object stored in the storing space 6 is the wafer 1 alone, the light transmitted from the light transmitting portion 36a of the third detecting means impinges on the curved side surface (see FIG. 4B) of the wafer 1 and is then reflected from this curved side surface. However, the light reflected from the curved side surface of the wafer 1 does not reach the light receiving portion 36b of the third detecting means in most cases. In this case, the light is not detected by the third detecting means, and the determining means of the determining apparatus 22 determines that the object stored in the storing space 6 is the wafer 1 alone.

In the determining apparatus 22 according to this preferred embodiment, the detecting means support member 28 may be vertically scanned in the condition where the first and second detecting means are inserted in the storing space 6 of the storing means 2 to a predetermined position. In this case, a plurality of objects stored in the storing space 6 can be determined at one time. A determining method in this case will now be described.

First, the first and second projections 30a and 30b are inserted into the storing space 6 to a predetermined position. Thereafter, light is transmitted from the light transmitting portion 32a of the first detecting means toward the light receiving portion 32b of the first detecting means. At the same time, the detecting means support member 28 is vertically moved. When the light transmitted from the light transmitting portion 32a is not received by the light receiving portion 32b, that is, when the height of the detecting means support member 28 becomes equal to the height of any one of the plural objects, the second detecting means is operated to determine the object at this height. This determination is repeated for all the other objects stored in the storing space 6 without stopping the vertical movement of the detecting means support member 28. As a result, the determining means of the determining apparatus 22 can determine whether the plural objects are a plurality of wafers 1 or a plurality of frame units 11.

The storing means 2 has a pair of opposed racks 8 each having a plurality of stages, wherein the wafer 1 or the frame unit 11 can be stored on each stage. However, a plurality of objects are not always stored on all the stages of each rack 8. Accordingly, unless the processing apparatus grasps the stage where the object is stored, the transfer means cannot be set at a proper height in loading the object from the storing means 2 to the processing apparatus. To cope with this problem, the detecting means support member 28 is vertically scanned in this preferred embodiment to thereby identify the stage where the object is stored. Further, in storing a plurality of objects into the storing means 2, all the objects are usually of the same kind and it is therefore sufficient to determine one of the plural objects. However, there is a case that different kinds of objects may be stored into the storing means 2 due to any circumstances. Even in such a case, the determining apparatus 22 according to this preferred embodiment can determine the different kinds of objects. Accordingly, if there is a problem in kinds of the objects, any abnormality can be instantaneously detected.

Figure 6A:
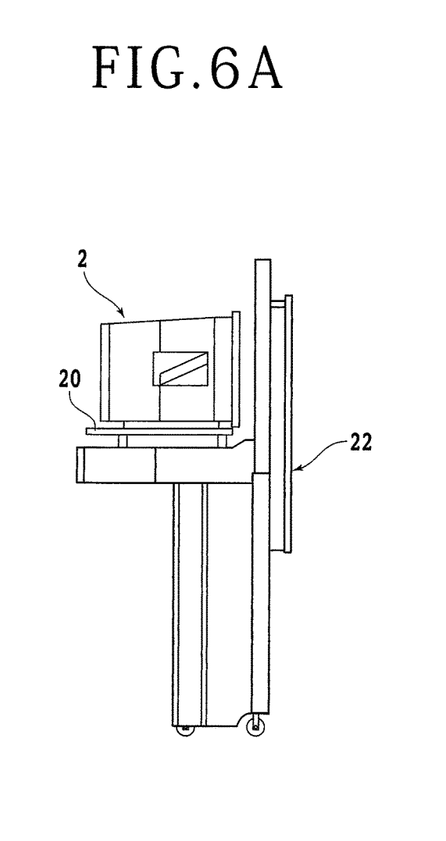
FIG. 6A is a schematic side view for illustrating an operative position of the determining apparatus when the storing means has been placed on the load port.
Figure 6B:
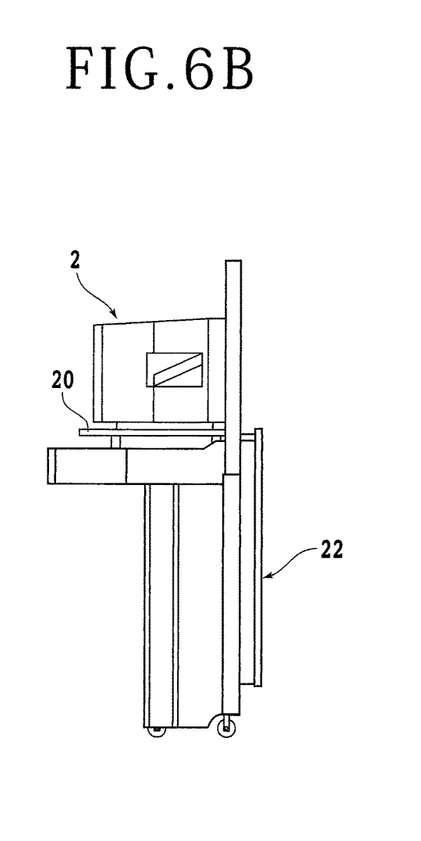
FIG. 6B is a schematic side view for illustrating an inoperative position of the determining apparatus in loading the object into a processing apparatus.

After determining the kind/kinds of the objects stored in the storing means 2 by operating the determining apparatus 22 as mentioned above, the processing apparatus is operated to select suitable transfer means according to the kind/kinds of the objects on the basis of the result of determination by the determining apparatus 22. Thereafter, the transfer means is operated to gain access to one of the objects stored in the storing means 2 and then take it out of the storing means 2, thereby loading the object into the processing apparatus. At this time, the determining apparatus 22 is lowered to the retraction position so as not to interfere with the loading operation by the transfer means. FIGS. 6A and 6B are schematic side views depicting different vertical positions of the determining apparatus 22 with respect to the storing means 2 placed on the load port 20. More specifically, FIG. 6A depicts an upper operative position where the storing means 2 has been placed on the load port 20 and the determining apparatus 22 is raised so as to face the storing means 2. FIG. 6B depicts a lower inoperative position where the determining apparatus 22 is lowered in transferring the object from the storing means 2 to the processing apparatus. As depicted in FIG. 6A, the determining apparatus 22 is set at a predetermined height (upper position) for the determination of the object when the storing means 2 is placed on the load port 20. Further, as depicted in FIG. 6B, the determining apparatus 22 is set at a retraction position (lower position) so as not to interfere with the loading operation of the transfer means in transferring the object from the storing means 2 to the processing apparatus.

According to the determining apparatus as described above, it is possible to reliably determine whether the object stored in the storing means (cassette) is a wafer alone or a frame unit formed by uniting a wafer and a ring frame.

The present invention is not limited to the above preferred embodiment, but various modifications may be made. For example, while each the first, second, and third detecting means in this preferred embodiment has a light transmitting portion for transmitting light and a light receiving portion for receiving the light transmitted from the light transmitting portion, the first, second, and third detecting means may use different wavelengths of light. In this case, each detecting means can detect only the corresponding wavelength of light, so that there is no possibility that the light transmitted from the light transmitting portion of the other detecting means may be erroneously detected.

Further, in determining whether the object stored in the storing means is the wafer alone or the frame unit, the determining apparatus in the above preferred embodiment utilizes the difference in shape between the wafer and the frame unit. As a modification, the storage position on the rack in storing the wafer alone into the storing means may be made different from that in storing the frame unit into the storing means. In this case, the determining apparatus may be configured to recognize the difference in this storage position, thereby determining the kind of the object stored in the storing means. Specifically, in the case of storing the wafer alone into the storing means, the wafer is set in a position far from the inlet/outlet portion of the storing means. On the other hand, in the case of storing the frame unit into the storing means, the frame unit is set in a position relatively near the inlet/outlet portion of the storing means. More specifically, in the case of storing the wafer alone into the storing means, the wafer is set in a position where the light transmitted from the light transmitting portion of the second detecting means is not blocked by the wafer, whereas in the case of storing the frame unit into the storing means, the frame unit is set in a position where the light transmitted from the light transmitting portion of the second detecting means is blocked by the frame unit.

Accordingly, when the light transmitted from the light transmitting portion of the second detecting means is not received by the light receiving portion of the second detecting means, it is determined that the object stored in the storing means is the frame unit. Conversely, when the light transmitted from the light transmitting portion of the second detecting means is received by the light receiving portion of the second detecting means, it is determined that the object stored in the storing means is the wafer alone. To effect this determination by the determining apparatus, the rack of the storing means may be configured so that the wafer and the frame unit are set at different positions.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. Apparatus for determining whether an object stored in a storing space is a wafer alone or a frame unit formed by uniting said wafer and a ring frame comprising;
   a first photodetector adapted to be inserted in the storing space and a second photodetector adapted to be inserted in the storing space more shallowly than said first photodetector;
   each said first photodetector and said second photodetector including corresponding first and second light transmitting portions and corresponding first and second light receiving portions spaced from each other by a predetermined distance in a horizontal direction;
   said first and second photodetectors being secured to a support member that moves vertically and horizontally;
   the support member vertically aligning the first and second photodetectors with the storing space and inserting said first and second photodetectors into the storing space to a predetermined position where light transmitted from said first light transmitting portion of said first photodetector is blocked by the object and does not reach said light receiving portion of said first photodetector;
   wherein light transmitted from said second light transmitting portion of said second photodetector is blocked by the object and does not reach second light receiving portion of said second photodetector when the object is the frame unit, and the light transmitted from said second light transmitting portion of said second photodetector is not blocked by the object and reaches said second light receiving portion of said second photodetector when, the object is the wafer.

2. The determining apparatus according to claim 1, further comprising:
   a third photodetector secured to the support member for detecting the frame unit;
   said third photodetector having a third light transmitting portion and a third light receiving portion spaced from each other by a predetermined distance in a horizontal direction parallel to a line connecting said third light transmitting portion and said third light receiving portion of said first photodetector, said predetermined distance between said third light transmitting portion and said third light receiving portion of said third photodetector being shorter than said predetermined distance between said first light transmitting portion and said first light receiving portion of said first photodetector;
   said support member moving said third photodetector towards the space to determine whether light transmitted from said first light transmitting portion of said first photodetector is blocked by the object and does not reach first light receiving portion of said first photodetector;
   wherein when light transmitted from said third light transmitting portion of said third photodetector is reflected on the object and then reaches said third light receiving portion of said third photodetector, the object is the frame unit.

* * * * *